Jan. 5, 1954  J. W. PARENT  2,664,979
VEHICLE BRAKE, CLUTCH, AND GAS CONTROL
Filed Sept. 7, 1950  3 Sheets-Sheet 1
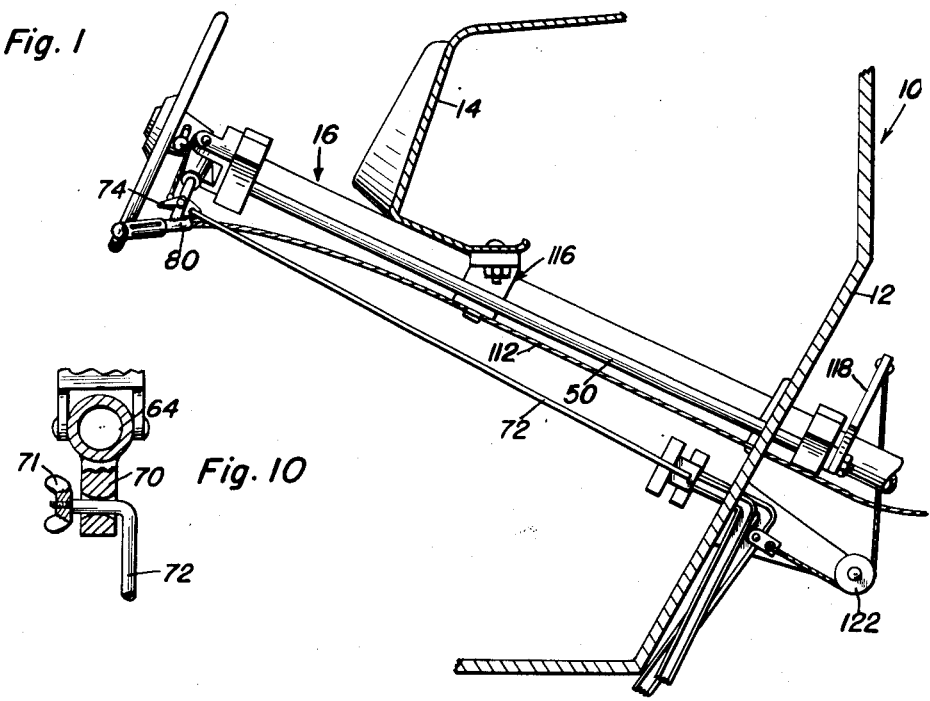
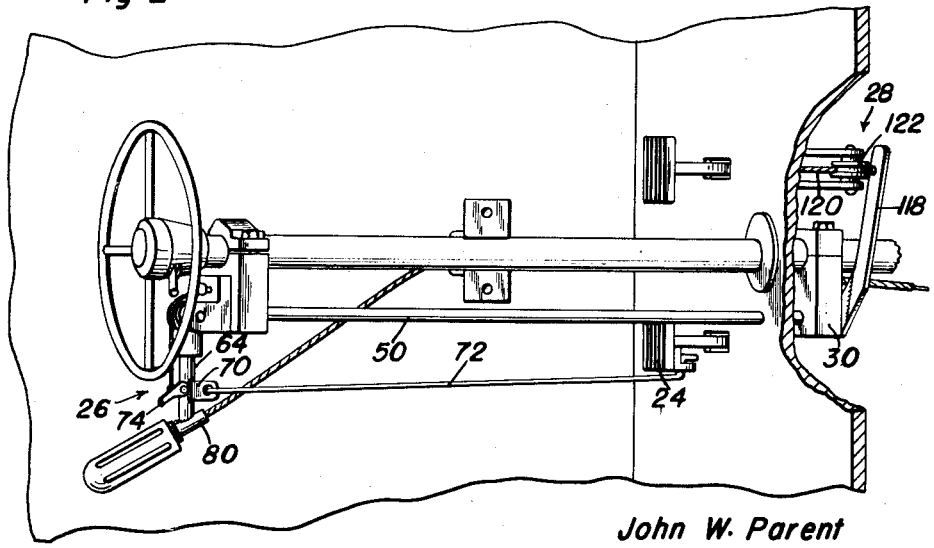
John W. Parent
INVENTOR.
BY *Clarence A. O'Brien*
*and Harvey B. Jacobson*
Attorneys Jan. 5, 1954   J. W. PARENT   2,664,979
VEHICLE BRAKE, CLUTCH, AND GAS CONTROL
Filed Sept. 7, 1950   3 Sheets-Sheet 2

John W. Parent
INVENTOR.

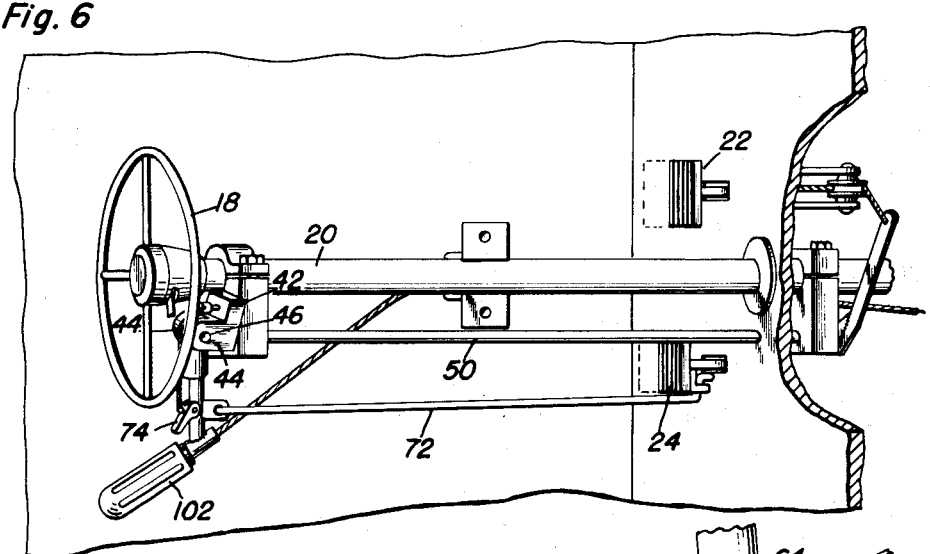
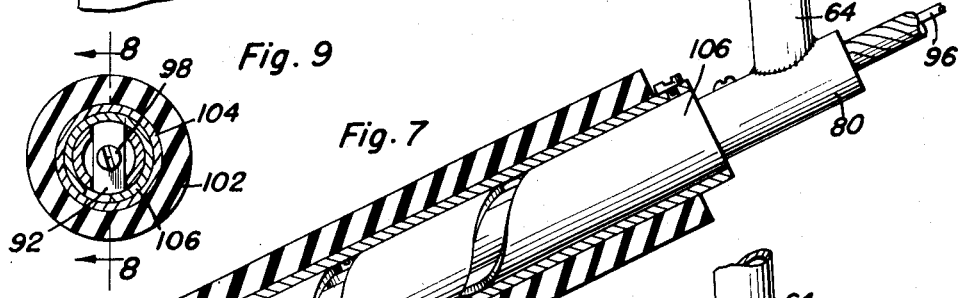
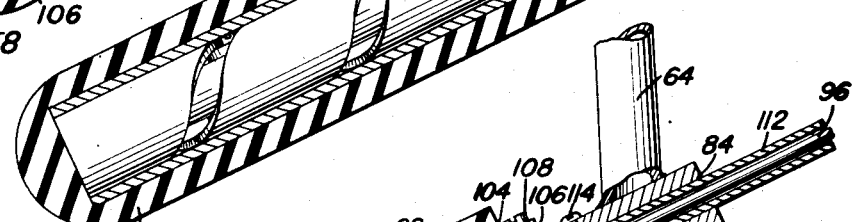
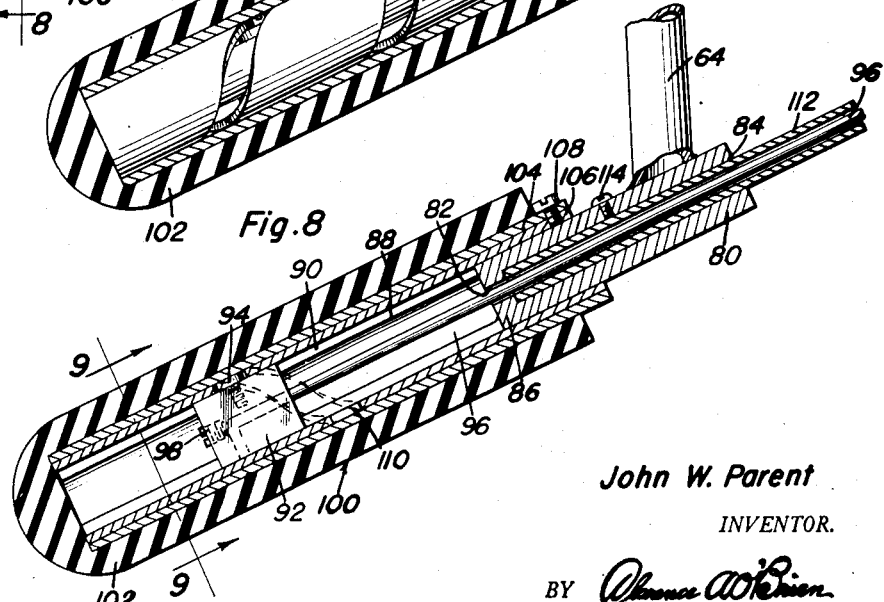
John W. Parent
INVENTOR.

Patented Jan. 5, 1954

2,664,979

UNITED STATES PATENT OFFICE 2,664,979

VEHICLE BRAKE, CLUTCH, AND GAS CONTROL

John W. Parent, Saratoga Springs, N. Y.

Application September 7, 1950, Serial No. 183,579

6 Claims. (Cl. 192—.094)

1

The present invention relates to improvements in controls for automotive vehicles, and more particularly to the type of control which is adapted to be mounted on conventional vehicles for operation by persons who are partially incapacitated to operate a conventional vehicle in the normal manner.

An object of the present invention is to provide a control means for automotive vehicles whereby the brakes, throttle and clutch may all be operated with one hand of the operator while the other hand is maintained on the steering wheel of the vehicle.

A further object of the present invention is to provide a means whereby the clutch may be disengaged and maintained in disengaged position by a detent means during the shifting of gears, and whereby the detent may be released by finger engaged means permitting re-engagement of the automobile clutch.

Still another object of the present invention is to provide a control means for automotive vehicles that is substantially embodied in a single mechanism which operates the brake, clutch and throttle by oscillatory, rotary, and pivoting movements of the operating means.

This invention also has for its object to provide an automobile control means that is positive in operation, convenient in use, easily installed in a working position and easily disconnected therefrom, and of relative simplicity.

Various other objects and advantages will be apparent from the detailed description to follow. In the description as well as in the claims, part are at times identified by specific names for convenience, but such nomenclature is intended to be as generic in its application to analogous parts as the prior art will permit.

The best form in which I have contemplated applying my invention is illustrated in the accompanying drawings, wherein:

Figure 1 is a side elevational view of the present invention installed on a conventional automotive vehicle;

Figure 2 is a top plan view of Figure 1;

Figure 6 is a top plan view similar to the view in Figure 2, but with the control means in stop position;

2

Figure 3:
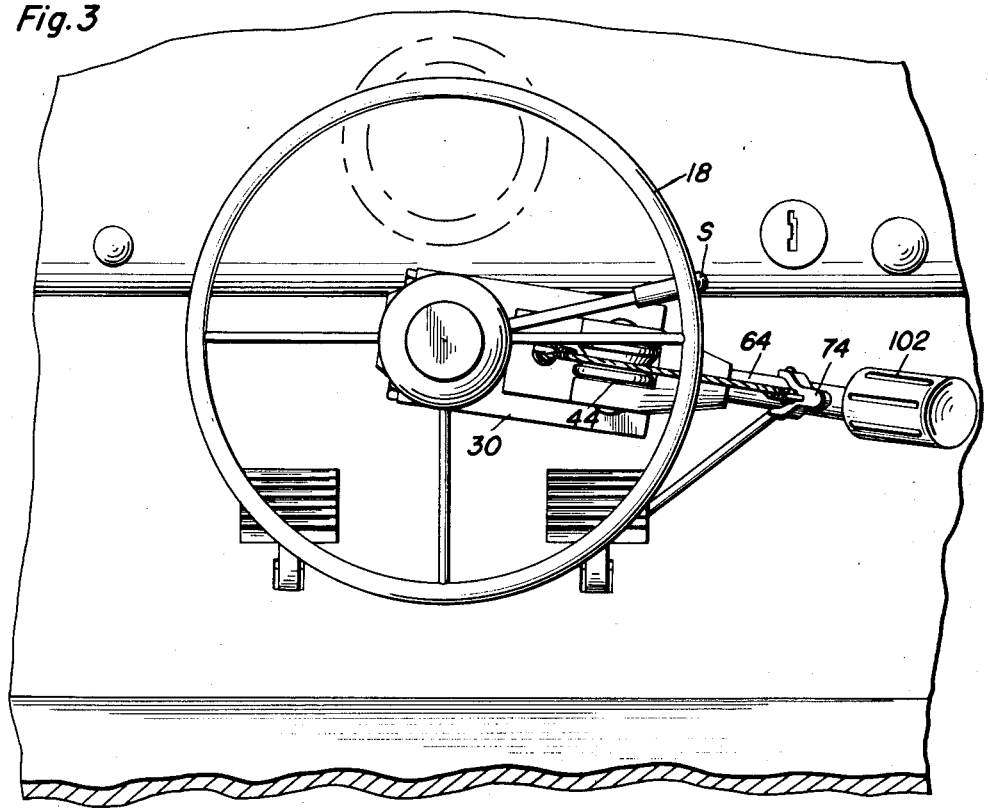
Figure 3 is an end plan view of the control means of the present invention.
Figure 5:
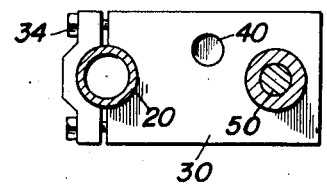
Figure 5 is a vertical transverse sectional view taken substantially along the plane of line 5—5 of Figure 4.

Figure 7 is a detailed section view of the throttle control means of the present invention;

Figure 8 is a detailed sectional view similar to Figure 7 showing more of the interior structure;

Figure 9 is a vertical transverse sectional view taken substantially along the plane of line 9—9 of Figure 8; and Figure 10 is a detail sectional view showing the connection between the brake connecting rod and the lever arm.

Referring more particularly to the drawings, wherein like numerals designate like parts throughout, numeral 10 designates generally the automotive vehicle of conventional form with which the control means of the present invention are associated, the vehicle including a floor board and fire wall 12, dashboard 14, steering wheel 18 and steering post housing 20, clutch pedal 22, and brake pedal 24. The numeral 26 designates generally the hand control means of the present invention with numeral 28 designating generally the linkage arrangement beneath the floor board and fire wall.

Figure 4:
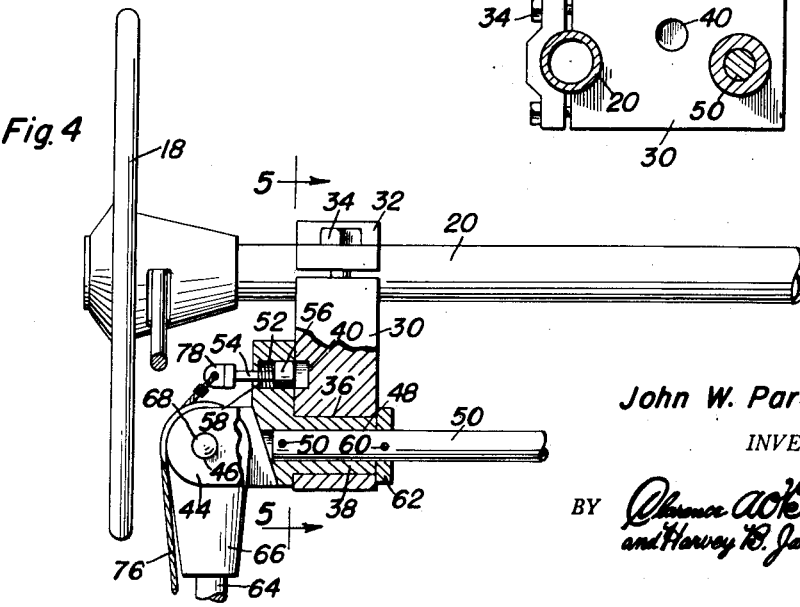
Figure 4 is a side elevational view of Figure 3 with parts in section.

As seen best in Figure 4, a mounting means 30 is removably mounted on the steering post housing 20 by means of the clamp element 32 and bolts 34. The mounting means 30 is provided with a bore 36 in which is rotatably mounted the bushing member 38. The mounting means 30 is also provided with a recess 40 for a purpose to be hereinafter described.

Looking now also at Figure 6, it will be seen that the bushing member 38 is provided with a base portion 42 and a pair of upstanding ears 44 having apertures 46 therein. The bushing member 38 is provided with a bore 48 for receiving the clutch rod 50 therein, and the base portion 42 is provided with a recess 52 and aperture 54 in which is slidably mounted the detent 56. The detent 56 is spring actuated for engagement with the recess 40 on the mounting means 30 by means of the resilient spring 58 seated within the recess 52. The clutch rod 50 is mounted for rotation with the bushing member 38 by means of the pins 60 which connect the rod 50 to the bushing member 38 and thrust element 62.

Pivotally mounted within the ears 44 is a lever arm 64 having a pivot mounting pin 66 pivotally mounted on the pin 68 secured in the apertures 46 of the ears 44. The lever arm 64 is provided with a downwardly extending apertured element 70 in which is pivotally mounted the brake connecting element 72 which has its lower end removably connected to the bottom side of the brake pedal 24. The upper end of the element 72 threadably receives a wing nut 71 for retaining abutment with the element 70 as seen in Figure 10.

Pivotally mounted on the upper side of the lever arm 64 is a lever element 74 which is adapted to be engaged by a finger of the operator and which is connected to the detent 56 by means of the cable 76 which passes over the rounded portion of the element 66 and is connected to the detent at one extremity by means of the connector 78.

Rigidly secured to the end of the lever arm 64 and angularly depending therefrom is a handle shaft 80, as best seen in Figures 7 and 8. The handle shaft 80 is provided with a longitudinal bore 82, an enlarged bore 84 on one side of the central wall 86 and a second enlarged bore 88 on the opposite side of the central partition wall 86. The handle shaft 80 is also provided with longitudinally extending slots 90 in which is slidably mounted the guide element 92. A cam engaging screw 94 is threadably mounted on the guide 92, and the upper end of the throttle control cable 96 is received within the guide 92 and secured therein by means of set screw 98.

Rotatably disposed on the handle shaft 80 is the handle sleeve 100 comprising an outer handle portion formed of rubber-like material at 102, and an inner pair of sleeve elements 104 and 106. The outer sleeve 104 is secured for rotation with the handle portion 102 by cementitious means or the like, and the inner sleeve 106 is removably secured to the outer sleeve 104 by means of the screw 108. The inner sleeve 106 is provided with a spiral cam groove 110 in which the head of the screw 94 is adapted to slide.

The throttle cable 96 is encased in a cable covering 112 which has its upper end received in the enlarged bore 84 and secured therein by means of a set screw 114.

The throttle control cable and covering 96 and 112 is supported at an intermediate portion by means of the steering post housing supporting bracket 116, and passes downwardly through the floor board to the throttle valve of the carburetor for control thereby.

The clutch control rod 50 extends downwardly from the mounting means 30 and passes through the floor board 12 and a second mounting means 30' and has a lever 118 secured to its ends for rotation therewith. The lever 118 has a cable 120 secured thereto which is adapted to be received over the sheave 122 and is connected at its other end to the clutch pedal 22. Rotation of the clutch rod 50 will of course cause reciprocation of the clutch pedal as will readily be seen.

From the foregoing description, taken in conjunction with the drawings, it is believed that the operation of the present invention will be readily apparent to one skilled in the art. As seen in Figure 6, the control means are in the stop position for the vehicle with the clutch pedal and brake pedal 22 and 24 in depressed position and the lever arm 64 pivoted to its lower most position and oscillated to the detent engaging position. When it is desired to motivate the vehicle, the handle 100 is pivoted upwardly on the pin 46 drawing the brake connecting element 72 upwardly and releasing the foot brake pedal 24. Next, the finger engaged element 74 is pivoted to remove the detent 56 from the recess 40 and the handle lever 64 is then rotated to clutch engaging position after the shifting of the gears. At the same time, the handle 100 may be rotated for opening the throttle valve and feeding gasoline for acceleration. When shifting from first gear to second gear, the handle lever 64 and clutch rod 50 are rotated to depress the clutch pedal 22, and after shifting, they are removed to the original position, feeding gas and cutting down the gas supply as desired by means of the handle control 100.

If it is desired that the vehicle be used by a person in the normal manner, the brake engaging portion of the brake connecting element 72 is removed from engagement with the foot pedal 24 and the vehicle may be operated conventionally.

From the foregoing description of the structure and operation of the control means of the present invention, it is believed that a device has been provided which will accomplish all of the objects hereinabove set forth.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

One such change contemplated as coming within the scope of the appended claims includes the positioning of the clutch pedal actuating mechanism above the floor board rather than below, since such a change would be well within the realm of an ordinary mechanic, and further description thereof is therefore deemed unnecessary.

Having thus described my invention, what I claim to be new is:

1. A combined brake, clutch and gas control apparatus for automotive vehicles comprising: a mounting means fixedly secured to a steering post housing, first means oscillatably mounted on said mounting means for engaging and disengaging the clutch, second means pivotally mounted on said first means for operating the brakes, third means rotatably mounted on said second means for operating the gas throttle, said second means including a lever arm pivotably mounted on said first means, a rod mounted for oscillation with said first means and extending downwardly beneath the floor board of the vehicle, and means connecting said rod to the clutch pedal for reciprocation thereof, said first means being operatively connected to a fourth means for releasably maintaining the clutch in disengaged position while shifting.

2. A combined brake, clutch and gas control apparatus for automotive vehicles comprising: a mounting means fixedly secured to a steering post housing, first means oscillatably mounted on said mounting means for engaging and disengaging the clutch, second means pivotably mounted on said oscillatably mounted means for applying the brakes, third means rotatably mounted on said second means for operating the gas throttle, said first means including a bushing pivotably and oscillatably mounted on said mounting means, a rod mounted for rotation with said bushing and extending downwardly beneath the floor board of the vehicle, means connecting said rod to the clutch pedal for reciprocation thereof, said first means being operatively connected to a fourth means for releasably maintaining the clutch in disengaged position while shifting, said fourth means including a spring pressed detent adapted to engage a recess in said mounting means when said bushing is ocillated to clutch disengaging position, and means for retracting said detent from said recess whereby said clutch may be engaged.

3. A manual control device for an automotive vehicle comprising a mounting means rigidly secured to a steering post housing, a bushing journaled in said mounting means, a second mounting means rigidly secured on said housing in spaced relation to said first means, a rod secured in said bushing and journaled in said second means, a lever fixed on said rod, flexible means connecting said lever to a clutch pedal, an operating lever pivotally mounted on said bushing on an axis transverse to said bushing, said operating lever being oscillatable in one plane to actuate the clutch rod, a brake rod secured to said lever and to a brake pedal, said operating lever being oscillatable in a plane transverse to said first mentioned plane to actuate said brake rod, a handle on said operating lever, a throttle rod connected to said handle, said handle being rotatable about its longitudinal axis to actuate said throttle rod, a spring-biased detent reciprocable in said bushing, a recess in said first mounting means for receiving said detent, a lever element pivotally mounted on said operating lever, a connection between said lever element and said detent, said lever element being oscillatable about an axis transverse to said operating lever to actuate said detent.

4. In an automotive vehicle having a steering wheel mounted on a steering post housing, said housing extending through the fire wall of the vehicle, a gear shift lever mounted on the steering post housing, brake and clutch levers mounted outside the fire wall and having actuating pedals extending through the fire wall, a manual control device comprising, a mounting means rigidly secured to a steering post housing, a bushing journaled in said mounting means, a second mounting means rigidly secured on said housing in spaced relation to said first means, a rod secured in said bushing and journaled in said second means, a lever fixed on said rod, flexible means connecting said lever to a clutch pedal, an operating lever pivotally mounted on said bushing on an axis transverse to said bushing, said operating lever being oscillatable in one plane to actuate the clutch rod, a brake rod secured to said lever and to a brake pedal, said operating lever being oscillatable in a plane transverse to said first-mentioned plane to actuate said brake rod, a handle on said operating lever, a throttle rod connected to said handle, said handle being rotatable about its longitudinal axis to actuate said throttle rod.

5. In an automotive vehicle having a steering wheel mounted on a steering post housing, said housing extending through the fire wall of the vehicle, a gear shift lever mounted on the steering post housing, brake and clutch levers mounted outside the fire wall and having actuating pedals extending through the fire wall, a manual control device comprising, a mounting means rigidly secured to a steering post housing, a bushing journaled in said mounting means, a second mounting means rigidly secured on said housing in spaced relation to said first means, a rod secured in said bushing and journaled in said second means, a lever fixed on said rod, flexible means connecting said lever to a clutch pedal, an operating lever pivotally mounted on said bushing on an axis transverse to said bushing, said operating lever being oscillatable in one plane to actuate the clutch rod, a brake rod secured to said lever and to a brake pedal, said operating lever being oscillatable in a plane transverse to said first-mentioned plane to actuate said brake rod, a spring-biased detent reciprocable in said bushing, a recess in said first mounting means for receiving said detent, a lever element pivotally mounted on said operating lever, a connection between said lever element and said detent, said lever element being oscillatable about an axis transverse to said operating lever to actuate said detent.

6. A combined brake, clutch and gas control apparatus, for an automotive vehicle having a steering post housing, comprising spaced apart mounting blocks fixedly secured to said steering post housing, a rod oscillatably mounted in said mounting blocks, clutch actuating means secured in driving relation to said rod, a lever for oscillating said rod to engage and disengage a clutch, said lever being pivotally mounted about a transverse axis on said oscillating rod, a connection to said lever for applying the brakes, a handle rotatably mounted on said lever, means actuated by said handle for actuating the gas control, locking means for releasably maintaining the clutch in disengaged position, release means for said locking means, said release means being mounted on said lever adjacent said handle.

JOHN W. PARENT.

References Cited in the file of this patent

UNITED STATES PATENTS

| Number | Name | Date |
| --- | --- | --- |
| 1,403,390 | Cameron | Jan. 10, 1922 |
| 1,541,712 | Horn | June 9, 1925 |
| 1,548,725 | Hanwaring | Aug. 4, 1925 |
| 1,552,135 | Frink | Sept. 1, 1925 |
| 1,671,375 | Oldfield | May 29, 1928 |
| 2,548,240 | Reeder | Apr. 10, 1951 |

OTHER REFERENCES

Autocar, pages 96–97, January 31, 1947.